(12) United States Patent
Kini et al.

(10) Patent No.: US 8,619,635 B2
(45) Date of Patent: Dec. 31, 2013

(54) E-TREE USING TWO PSEUDOWIRES BETWEEN EDGE ROUTERS WITH ENHANCED FORWARDING METHODS AND SYSTEMS

(75) Inventors: Sriganesh Kini, Fremont, CA (US); David Sinicrope, Cary, NC (US); Michael Chen, Beijing (CN); Marc Rapoport, Palo Alto, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 93 days.

(21) Appl. No.: 13/251,162

(22) Filed: Sep. 30, 2011

(65) Prior Publication Data

US 2013/0003607 A1    Jan. 3, 2013

Related U.S. Application Data

(60) Provisional application No. 61/502,501, filed on Jun. 29, 2011, provisional application No. 61/502,505, filed on Jun. 29, 2011.

(51) Int. Cl.
*H04L 12/28* (2006.01)

(52) U.S. Cl.
USPC ............ 370/256; 370/255; 370/392; 370/400

(58) Field of Classification Search
USPC ......................................... 370/255, 392, 400
See application file for complete search history.

(56) References Cited

U.S. PATENT DOCUMENTS

| | | | |
|---|---|---|---|
| 8,385,355 B1 * | 2/2013 | Figueira et al. ............... | 370/401 |
| 2011/0164617 A1 * | 7/2011 | Yong .............................. | 370/392 |

OTHER PUBLICATIONS

Rafi Ram et al., Extension to LDP-VPLS for E-Tree Using Two PW, May 18, 2011, IETF, draft-ram-12vpn-ldp-vpls-etree-2pw-02.txt, p. 1-9.*

Ram, R., et al., "Extension to LDP-VPLS for E-Tree Using Two PW; draft-ram-12vpn-ldp-vpls-etree-2pw-02.txt", Network Working Group, Internet Draft, Category: Standard Track, May 18, 2011, 10 pages.

Marc Lasserre et al., "Virtual Private LAN Service (VPLS) Using Label Distribution Protocol (LDP) Signaling," Network Working Group, Request for Comments 4762, Jan. 2007, 31 pages, The IETF Trust.

Rafi Ram et al., "Extension to LDP-VPLS for E-Tree Using Two PW draft-ram-12vpn-ldp-vpls-etree-2pw-02.txt," Network Working Group, Internet Draft, May 18, 2011, 9 pages.

(Continued)

*Primary Examiner* — Huy D Vu
*Assistant Examiner* — Kuo T Chiang
(74) *Attorney, Agent, or Firm* — Blakely Sokoloff Taylor & Zafman LLP

(57) ABSTRACT

An e-tree service that includes establishing two pseudowires (PW) between edge network elements with enhanced packet forwarding is described. In one embodiment, a root PW is used for carrying packets that are sent from a root node network element, and a leaf PW is used for carrying packets that are sent from a leaf node network element in the e-tree service network. When a network element receives a packet with a destination Media Access Control (MAC) address on the logical port associated with the leaf access circuit (AC), responsive to determining that the destination MAC address corresponds to a MAC address in a MAC address table stored in the network element, and that an attribute associated with that MAC address in the MAC address table indicates the MAC address was learned from the leaf PW, the network element drops the packet.

18 Claims, 9 Drawing Sheets

(56) References Cited

OTHER PUBLICATIONS

Raymond Key et al., "Requirements for MEF E-Tree Support VPLS draft-key-l2vpn-vpls-etree-reqt-03," Network Working Group, Internet Draft, Apr. 2, 2011, 14 pages, IETF Trust and the persons identified as the document authors.

Simon Delord et al., "Control Word Reserved bit for use in E-Tree draft-delord-pwe3-cw-bit-etree-05," Network Working Group, Internet Draft, Apr. 15, 2011, 9 pages, IETF Trust and the persons identified as the document authors.

Notice of Allowance, U.S. Appl. No. 13/251,167, dated May 14, 2013, 20 pages.

* cited by examiner

E-TREE USING TWO PSEUDOWIRES BETWEEN EDGE ROUTERS WITH ENHANCED FORWARDING METHODS AND SYSTEMS

CROSS-REFERENCE TO RELATED APPLICATIONS

This application claims the benefit of U.S. Provisional Application No. 61/502,501, filed Jun. 29, 2011 and U.S. Provisional Application No. 61/502,505, filed Jun. 29, 2011, which are hereby incorporated by reference.

FIELD

Embodiments of the invention relate to the field of networking; and more specifically, to an e-tree service network.

BACKGROUND

E-tree is an Ethernet service defined by Metro Ethernet Forum (MEF) as a particular rooted multipoint form of an Ethernet Local Area Network (LAN) service. In an e-tree service network, there are two types of network nodes: (1) root nodes; and (2) leaf nodes. A packet sent by a root node may be delivered to other root nodes and other leaf nodes. However, a packet sent by a leaf node is restricted to be delivered only to root nodes in the e-tree service network. In other words, a packet sent by a leaf node is not allowed to be delivered to another leaf node. A packet originating from a leaf node destined for another leaf node should not be delivered in an e-tree service instance.

In conventional VPLS networks, each Provider Edge (network element PE) network element establishes a pseudowire (PW) to every other PE in the network to form a full mesh of PWs between all the PEs in the network. A packet send from any network node may be delivered to any other network node. In this sense, all network nodes in a conventional VPLS network behave like a root node. Hence, in order to implement an e-tree service in a VPLS network, the network element PEs in the network must have a way to differentiate between packets originating from a root node and packets originating from a leaf node, such that any packet originating from a leaf node destined for another leaf node is not forwarded on by the network element PE.

One mechanism to differentiate between packets originating from a root node and packets originating from a leaf node is to modify a control word in each packet to identify the packet as originating from a root node or a leaf node. However, in order to process the modified control word in a network element PE, changes to existing network element PE's internal hardware are required, because the network element PE has to look up an extra field beyond the label stack to perform branching-decisions based on the contents of the control word to determine whether to forward the packet or not.

SUMMARY

Methods and apparatus for address learning and enhanced packet forwarding in an e-tree service network are described. According to one embodiment, two pseudowires (PW) are established between two edge network elements in the e-tree service network: (1) a root PW for carrying packets that are sent from a root node network element; and (2) a leaf PW for carrying packets that are sent from a leaf node network element. Each of the edge network elements include a logical port associated with a leaf access circuit (AC) that is coupled to a local leaf node, a logical port associated with a root AC that is coupled to a local root node, a logical port associated with the root PW, and a logical port associated with the leaf PW. When an edge network element receives a packet with a destination Media Access Control (MAC) address on the logical port associated with the leaf AC, responsive to determining that the destination MAC address corresponds to a MAC address in a MAC address table stored in the edge network element, and that an attribute associated with that MAC address in the MAC address table indicates the MAC address was learned from the leaf PW, the edge network element drops the packet. If it is determined that the attribute associated with the MAC address in the MAC address table indicates that the MAC address was learned from the root PW, the edge network element forwards the packet out the logical port associated with the leaf PW regardless of which of the logical ports that the MAC address is associated with in the MAC address table.

According to another embodiment, an edge network element in an e-tree service network includes a set of one or more processors, and a memory coupled with the set of processors. The memory stores instructions that when executed by the set of processors, cause the set of processors to perform as follows. When the edge network element receives a packet with a destination MAC address on a logical port associated with a leaf AC that is to couple the edge network element with a local leaf network element in the e-tree service network, then responsive to determining that the destination MAC address corresponds to a MAC address in a MAC address table stored in the edge network element, and that an attribute associated with the MAC address in the MAC address table indicates that the MAC address was learned from a leaf PW that is to couple the edge network element with another edge network element in the e-tree service network, the edge network element drops the packet. Responsive to determining that the destination MAC address corresponds to a MAC address in the MAC address table, and that the attribute associated with the MAC address in the MAC address table indicates that the MAC address was learned from a root PW that is to couple the edge network element with the another edge network element in the e-tree service network, the edge network element forwards the packet out the logical port associated with the leaf PW regardless of which of the logical ports that the MAC address is associated with in the MAC address table.

According to a further embodiment, a network element in an e-tree service network includes a MAC address table, a learning module coupled to the MAC address table, and a forwarding module coupled to the address table. The MAC address table is configured to store a set of associations between logical ports of the network element and MAC addresses of the other network elements in the e-tree service network, where the set of associations include an attribute to indicate whether a particular MAC address was learned from a PW and a type of that PW (either a root PW or a leaf PW). The learning module is configured to capture source MAC addresses of packets received at the network element, and to associate the source MAC addresses with the logical ports of the network element in the MAC address table. The forwarding module is configured to look up destination MAC addresses of the packets received at the network element in the MAC address table, and to determine whether to forward or to discard each of the packets based on the set of associations stored in the MAC address table.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
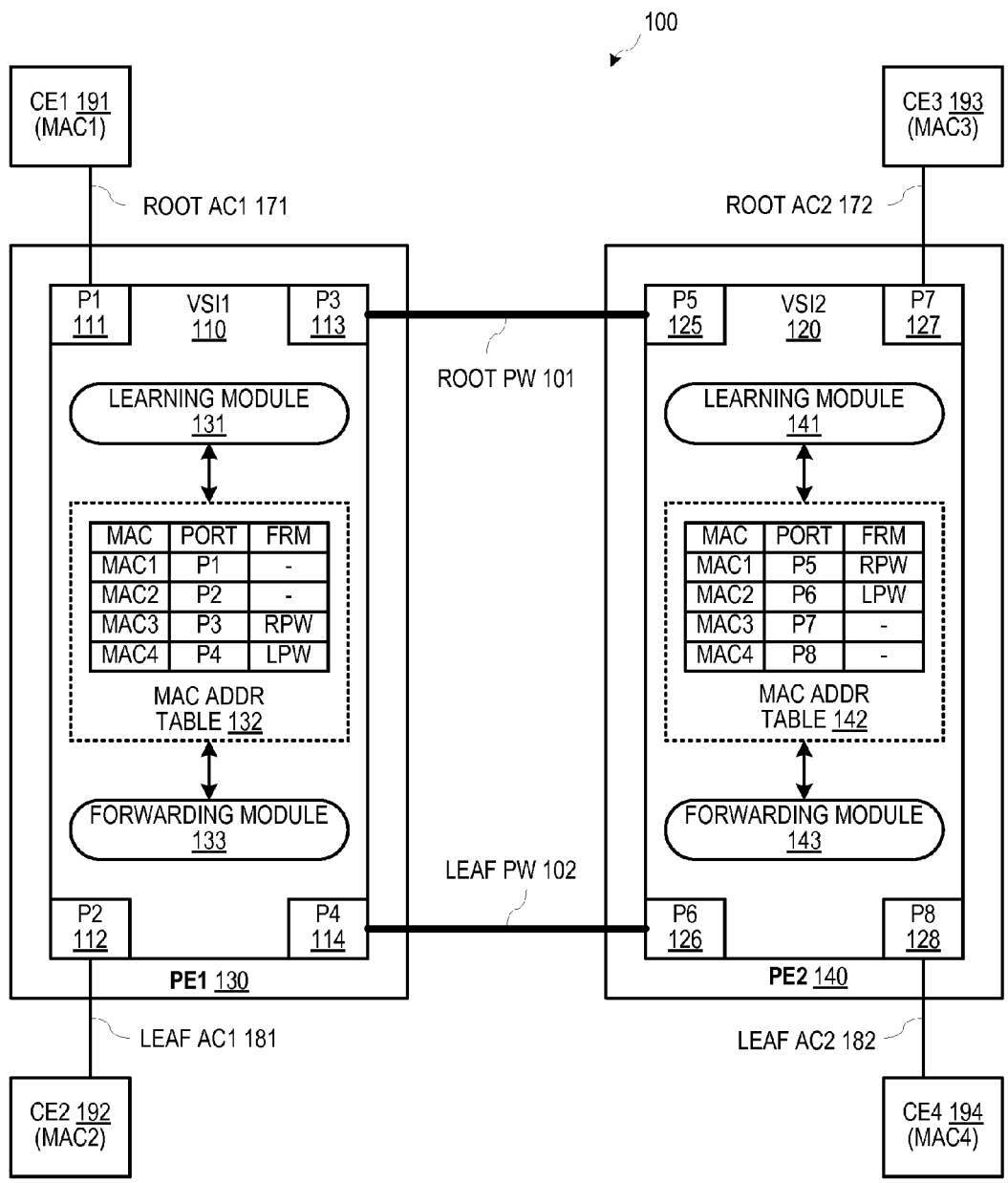
FIG. 1 illustrates an exemplary e-tree service network according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VoIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Some network elements provide support for VPLS (Virtual Private LAN Service). For example, in a VPLS network, subscriber end stations access content/services provided through the VPLS network by coupling to CEs, which are coupled through network element PEs coupled by other network elements. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow subscriber end stations that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a network element PE via an attachment circuit also known as an access circuit (e.g., a virtual link or connection between the CE and the network element PE). The bridge module of the network element PE attaches to an emulated LAN through an emulated LAN interface. Each bridge module acts as a "Virtual Switch Instance" (VSI) by maintaining a forwarding table that maps MAC addresses to pseudowires and attachment circuits. Network element PEs forward frames (received from CEs) to destinations (e.g., other CEs, other network element PEs) based on the MAC destination address field included in those frames.

FIG. 1 illustrates a simple exemplary e-tree service network according to one embodiment of the present invention. In this simplified network 100, there are two network elements PE1 130 and PE2 140 acting as provider's edge network elements. Network element PE1 130 has a virtual switch interface VSI1 110 with four logical ports. Similarly, network element PE2 140 has a virtual switch interface VSI2 120 with four logical ports. While network elements PE1 130 and PE2 140 are shown to each have four logical ports, it should be understood that the virtual switch interface in these network elements may have any number of logical ports. Network element PE1 130 has one root access circuit (AC) RAC1 171 coupled to a customer edge network element CE1 191 with Media Access Control (MAC) address MAC1, and one leaf AC LAC1 181 coupled to another customer edge network element CE2 192 with MAC address MAC2. Thus, in this exemplary network, network element CE1 191 is a root node, and network element CE2 192 is a leaf node. Similarly, network element PE2 140 has one root access circuit RAC2 172 coupled to a customer edge network element CE3 193 with MAC address MAC3, and one leaf access circuit LAC2 182 coupled to another customer edge network element CE4 194 with MAC address MAC4. Thus, network element CE3 193 is a root node, and network element CE4 194 is a leaf node. Instead of a conventional single pseudowire (PW), network element PE1 130 is coupled to network element PE2 140 through a set of PWs including a root PW (RPW) 101 for carrying packets that are sent from a root node network element in the e-tree service network and a leaf PW (LPW) 102 for carrying packets that are sent from a leaf node network element in the e-tree service network. At each of network elements PE1 130 and PE2 140, each PW has its own discrete logical port assignment such that the two PWs do not share the same logical port. Thus, each of network elements PE1 130 and PE2 140 includes: (1) a logical port associated with a leaf AC that is coupled to a local leaf node; (2) a logical port associated with a root AC that is coupled to a local root node; (3) a logical port associated with a root PW; and (4) a logical port associated with a leaf PW. In other embodiments, each of network elements PE1 130 and PE2 140 may have other logical ports that are associated with other nodes coupled to other network elements and/or other sets of PWs coupled to other edge network elements. Furthermore, it is not necessary for network elements PE1 130 and PE2 140 to each have any logical port associated with a local AC. For example, in an alternative embodiment, network element PE2 140 may not have a locally connected leaf AC, and hence network element PE2 140 may have only three active logical ports in the e-tree service network 100.

In accordance with one embodiment of the present invention, a network element in the e-tree service network is configured to discard illegal packets without forwarding illegal packets to other network elements in the e-tree service network. While the present invention is described with reference to an e-tree service having only one type of provider's edge network elements, it should be understood that an individual edge network element in accordance with the present invention (e.g., network element PE1) can also be deployed in an e-tree service network with other types of edge network elements that may use other types e-tree service packet forwarding techniques. Furthermore, while the present invention is described with reference to network elements PE1 130 and PE2 140 as being provider's edge network elements, the components and methods as described herein can be applied to other types of network elements as well.

By way of example, the components of network element PE1 130 will now be described. Network element PE2 140 has analogous components. The network element PE1 130 includes a MAC address table 132, a learning module 131, and a forwarding module 133. As described herein, each of the modules can be implemented in software, hardware, or a combination of both. The MAC address table 132 is configured to store a set of associations between the logical ports of network element PE1 130 and MAC addresses of other network elements in the e-tree service network. The MAC address table 132 enables network element PE1 to determine if a packet should be forwarded from network element PE1 130 to another network element in the e-tree service network. Entries in the MAC address table 132 associates a particular logical port in network element PE1 130 with the MAC address of another network device in the network that was learned through that particular logical port. The set of associations in the MAC address table 132 includes an attribute to indicate whether a particular MAC address was learned from a PW and a type of that PW, where the PW type is either a root PW or a leaf PW. In one embodiment, the attribute is a "learned from (FRM)" attribute. A value of "LPW" indicates that the MAC address was learned from a logical port that is associated with a leaf PW, and a value of "RPW" indicates that the MAC address was learned from a logical port that is associated with a root PW. A "null" value indicates that the MAC address was not learned from a logical port associated with a PW (e.g., the MAC address was learned from a logical port associated with a root access circuit or a leaf access circuit). In an alternative embodiment, a default value for the "learned from" attribute can be used to indicate that the MAC address was not learned from a logical port associated with a PW. In other embodiments, more than one attribute may be used. For example, in another embodiment, there can be a "learned from root PW" attribute and a separate "learned from leaf PW" attribute in the MAC address table 132.

The network element PE1 130 also includes a learning module 131 coupled to the MAC address table 132. The learning module 131 is configured to capture source MAC addresses of packets received at the network element PE1 130, and to associate the source MAC addresses with the logical ports of the network element PE1 130 in the MAC address table 132. In one embodiment, the learning module 131 is also configured to assign a value to the "learned from" attribute in the MAC address table 132 based on whether the logical port, that received the packet with a particular source MAC address, is associated with a PW and the type of that PW (i.e. a root PW or a leaf PW).

The network element PE1 130 also includes a forwarding module 133 coupled to the MAC address table 132. The forwarding module 133 is configured to look up destination MAC addresses of the packets received at the network element PE1 130 in the MAC address table 132, and to determine whether to forward or to discard each of the packets based on the set of associations stored in the MAC address table 132. The forwarding module 133 is also configured to determine which of the logical ports to broadcast a packet if that packet's destination MAC address is not in the MAC address table 132. This broadcasting of packets with unknown destination MAC addresses facilitates the MAC address learning process.

When the network element PE1 130 receives a packet on a logical port associated with a leaf AC that couples the network element PE1 to a local leaf network element in the e-tree service (e.g., receives a packet on logical port P2 112), the forwarding module 133 discards that packet if the destination MAC address of that packet matches a corresponding MAC address in the MAC address table 132, and the attribute associated with that MAC address in the MAC address table 132 indicates that the MAC address was learned from a leaf PW. If that packet's destination MAC address matches a corresponding MAC address in the MAC address table 132 and the attribute associated with that MAC address in the MAC address table 132 indicates that the MAC address was learned from a root PW, the forwarding module 133 forwards that packet onto the leaf PW 102 instead. Because the forwarding decision is performed locally within each of the edge network elements in the e-tree service network, packets from a local leaf node received in one edge network element destined for a remote leaf node attached to another edge network element are locally discarded. Hence, such packets are never transmitted across the PWs to minimize unnecessary network traffic between edge network elements to yield a more efficient e-tree service network.

By way of example, network element PE1 130 is configured by a network administrator to have the following logical port assignments in the VSI 110 of network element PE1 130 (1) root access circuit RAC1 171 is assigned logical port P1 111; (2) leaf access circuit LAC1 181 is assigned to logical port P2 112; (3) root PW 101 is assigned logical port P3 113; and (4) leaf PW 102 is assigned logical port P4 114. Similarly, network element PE2 140 is configured to have the following logical port assignments in the VSI2 120 of network element PE2 140: (1) root access circuit RAC2 172 is assigned logical port P7 127; (2) leaf access circuit LAC2 182 is assigned to logical port P8 128; (3) root PW 101 is assigned logical port P5 125; and (4) leaf PW 102 is assigned logical port P6 126. Hence, each network element is individually aware of its own local logical port assignments and is aware of the type of node that is attached to each of the network element's own local logical ports.

Initially, although network element PE1 130 has knowledge of the types of node that are locally connected based on the logical port assignment described above, network element PE1 130 has no knowledge of the MAC addresses of any of the other network elements that are coupled to those logical ports. During an address learning process, the learning module 131 of network element PE1 130 captures the source MAC addresses of packets sent to network element PE1 130 from the other network elements in the network. In accordance with one embodiment of the present invention, when network element PE1 130 receives a packet with a source MAC address on one of its logical ports, responsive to determining that the MAC address table 132 does not have an entry corresponding to that source MAC address, the learning module 131 in network element PE1 stores, in a new entry in the MAC address table 132: (1) the source MAC address of the packet; (2) the logical port that the packet was received on; and (3) if that logical port is associated with one of the PW, an attribute to indicate whether that logical port is associated with the root PW 101 or with the leaf PW 102.

For example, when a packet originating from CE1 191 with source MAC address MAC1 is received on logical port P1 111 (assigned to RAC1 171), the learning module 131 in network element PE1 130 stores the MAC address MAC1 in an entry in the MAC address table 132 and associates MAC1 with logical port P1 111 in that entry. When a packet originating from CE2 192 with source MAC address MAC2 is received on logical port P2 112 (assigned to leaf access circuit LAC1 181), the learning module 131 in network element PE1 130 stores the MAC address MAC2 in an entry in the MAC address table 132 and associates MAC2 with logical port P2 112 in that entry. Hence, if a MAC address is learned from a locally connected leaf or root AC, the MAC address table 132 is populated with an entry that associates the learned MAC address with the logical port number of that locally connected leaf or root AC.

When a packet originating from CE3 193 with source MAC address MAC3 is received on logical port P3 113 (assigned to root PW), the learning module 131 in network element PE1 130 stores the MAC address MAC3 in an entry in the MAC address table 132 and associates MAC3 with logical port P3 113 in that entry. In addition, the learning module 131 also indicates for this entry that the MAC address is learned from a root PW. When a packet originating from CE4 194 with source MAC address MAC4 is received on logical port P4 114 (assigned to leaf PW), the learning module 131 in network element PE1 130 stores the MAC address MAC4 in an entry in the MAC address table 132 and associates MAC4 with logical port P4 114. In addition, the learning module 131 also indicates for this entry that the MAC address is learned from a leaf PW. Hence, if an address is learned from a PW, the MAC address table 132 is populated with an entry that associates the learned MAC address with the logical port number of that PW, and in addition, the learning module 131 also indicates in the entry what PW type the MAC address is learned from.

It should be noted that initially, before network element PE2 140 has learned the MAC addresses of the network elements locally coupled to network element PE1 130, the packets that are received by network element PE1 130 on either the root PW 101 or the leaf PW 102 are packets that are broadcasted from network element PE2 140. For example, a packet originating from network element CE3 193 or a local root node with an unknown destination MAC address will be broadcasted on the root PW 101 to network element PE1 130 by network element PE2 140. Network element PE2 140 will broadcast the packet on root PW 101 instead of leaf PW 102 because network element PE2 140 is aware that this packet originated from a local root AC, and packets originating from a root node should be sent on the root PW 101. Similarly, a packet with an unknown destination MAC address originating from CE4 194 or a local leaf node will be broadcasted by network element PE2 140 on the leaf PW 102 instead of root PW 101. The broadcast mechanism to facilitate the MAC address learning process as described herein is different from conventional broadcast methods in that a packet with an unknown destination MAC address is not broadcasted on all logical ports. Instead, the packet is selectively broadcasted on either the root PW 101 or the leaf PW 102 and other appropriate locally connected ACs.

By way of example, the broadcast mechanism in accordance with one embodiment of the present invention will now be described with reference to network element PE1 130. When network element PE1 130 receives a packet with a destination MAC address that is not in MAC address table 132, that packet is broadcasted out on the appropriate logical ports according to the e-tree service network requirements. For example, when network element PE1 130 receives a packet on logical port P2 112 associated with leaf access circuit LAC1 181 that is coupled to local leaf node network element CE2 192, responsive to determining that the MAC address table 132 does not have an entry corresponding to the destination MAC address of that packet, the forwarding module 133 of network element PE1 130 broadcasts that packet out logical port P4 114 onto the leaf PW 102 towards network element PE2 140 and out logical port P1 111 onto the root access circuit RAC1 171 towards the local root node network element CE1 191. In another embodiment where network element PE1 130 has other logical ports associated with local root ACs, this packet is also broadcasted on those other logical ports that are associated with other local root ACs. This packet is not broadcasted on the root PW 101 because this packet originated from a local leaf node. Furthermore, this packet is not broadcasted on any logical ports that are associated with a local leaf AC because a packet from a leaf node should not be forwarded to another leaf node according to the e-tree service network requirements.

When network element PE1 130 receives a packet on logical port P1 111 associated with leaf access circuit RAC1 171 that is coupled to local root network element CE1 191, responsive to determining that the MAC address table 132 does not have an entry corresponding to the destination MAC address of that packet, the forwarding module 133 of network element PE1 130 broadcasts that packet out logical port P3 113 onto the root PW 101 towards network element PE2 140 and out logical port P2 112 onto the leaf access circuit LAC1 181 towards the local leaf node network element CE2 192. In another embodiment where network element PE1 130 has other logical ports associated with other local leaf and root ACs, this packet is also broadcasted on those other logical ports that are associated with other local leaf and root ACs. This packet is not broadcasted on the leaf PW 102 because this packet originated from a local root node.

When network element PE1 130 receives a packet on logical port P3 113 associated with root PW 101, responsive to determining that the MAC address table 132 does not have an entry corresponding to the destination MAC address of that packet, the forwarding module 133 of network element PE1 130 broadcasts that packet out logical port P1 111 onto the root access circuit RAC1 171 towards local root node network element CE1 191 and out logical port P2 112 onto the leaf access circuit LAC1 181 towards the local leaf node network element CE2 192. In another embodiment where network element PE1 130 has other logical ports associated with other local leaf and root ACs, this packet is also broadcasted on those other logical ports that are associated with other local leaf and root ACs. This packet is not broadcasted on the leaf PW 102 towards network element PE2 140 because this packet originated from network element PE2 140 and because this packet originated from a remote root node. In an alternative embodiment where network element PE1 130 has additional root PWs connected to other network elements in the e-tree service network, this packet would also be broadcasted onto those other root PWs.

When network element PE1 130 receives a packet on logical port P4 114 associated with leaf PW 102, responsive to determining that the MAC address table 132 does not have an entry corresponding to the destination MAC address of that packet, the forwarding module 133 of network element PE1 130 broadcasts that packet out logical port P1 111 onto the root access circuit RAC1 171 towards local root node network element CE1 191. In another embodiment where network element PE1 130 has other logical ports associated with other local root ACs, this packet is also broadcasted on those other logical ports that are associated with other local root ACs. This packet is not broadcasted on the root PW 101 towards network element PE2 140 because this packet originated from network element PE2 140 and because this packet originated from a remote leaf node. Furthermore, this packet is not broadcasted on any logical ports that are associated with a local leaf AC because a packet from a leaf node should not be forwarded to another leaf node according to the e-tree service network requirements. In an alternative embodiment where network element PE1 130 has additional leaf PWs connected to other network elements in the e-tree service network, this packet would also be broadcasted onto those other leaf PWs.

Using the address learning process and the broadcasting mechanism to facilitate the address learning process as described above, the learning module 131 would populate the MAC address table 132 in network element PE1 130 as shown in FIG. 1 for the exemplary e-tree service network 100. Similarly, the learning module 141 in network element PE2 140 would populate its MAC address table 142 as shown using a similar address learning process. An enhanced packet forwarding mechanism using the MAC address tables according to one embodiment of the present invention will now be described.

By way of example, when network element PE1 130 receives a packet on logical port P2 112 associated with leaf access circuit LAC1 181 that is coupled to local leaf node network element CE2 192, responsive to determining that the destination MAC address of this packet corresponds to a MAC address in the MAC address table 132 stored in the network element PE1 130, and that an attribute associated with this MAC address in the MAC address table 132 indicates that this MAC address was learned from the leaf PW 102, the forwarding module 133 drops and discards this packet. If the attribute associated with this MAC address in the MAC address table 132 indicates that this MAC address was learned from the root PW 101 instead, then the forwarding module 133 forwards the packet out on logical port P4 114 onto the leaf PW 102 towards network element PE2 140 regardless of which of the logical ports that this MAC address is associated with in the MAC address table 132. Note that this aspect of the forwarding mechanism is different from conventional forwarding methods in that, if the attribute in the MAC address table 132 indicates the destination MAC address of the incoming packet was learned from a root PW, this packet may not be forwarded onto the logical port that is associated with this MAC address as indicated in the MAC address table 132. Rather, this packet may be forwarded onto a logical port that is different than what is indicated in the MAC address table 132. More specifically, this packet is forwarded onto the logical port that is associated with the leaf PW 102 regardless of what is indicated in the MAC address table 132.

Still referring to a packet that is received on logical port P2 112 that is associated with leaf access circuit LAC1 181, if the attribute in the MAC address table 132 indicates that the destination MAC address of the incoming packet was not learned from a PW, then responsive to determining that the logical port associated with the destination MAC address in the MAC address table 132 is associated with a root AC (e.g., root access circuit RAC1 171), the forwarding module 133 forwards the packet onto the logical port as indicated in the MAC address table 132. If it is determined that the logical port is associated with another leaf AC, the forwarding module 133 drops and discards the packet.

When network element PE1 130 receives a packet on logical port P4 114 associated with leaf PW 102, responsive to determining that the destination MAC address of this packet corresponds to a MAC address in the MAC address table 132 stored in the network element PE1 130, and that this MAC address is associated with a logical port that is associated with a leaf AC (e.g., leaf access circuit LAC1 181), the forwarding module 133 drops and discards this packet. If it is determined that this MAC address is associated with a logical port that is associated with a root AC (e.g., root access circuit RAC1 171) instead of a leaf AC, then the forwarding module 133 forwards this packet onto the logical port as indicated by the MAC address table 132.

When network element PE1 130 receives a packet on logical port P1 111 that is associated with root access circuit RAC1 171, responsive to determining that the destination MAC address of this packet corresponds to a MAC address in the MAC address table 132 stored in the network element PE1 130, and that this MAC address is associated with a logical port that is associated with a leaf AC (e.g., leaf access circuit LAC1 181) or another local root AC, the forwarding module 133 forwards this packet onto that logical port as indicated by the MAC address table 132. If it is determined that the logical port associated with the destination MAC address is not associated with a local AC, then the forwarding module 133 forwards this packet out logical port P3 113 that is associated with the root PW 101 towards network element PE2 140 regardless of which of the logical ports that the destination MAC address is associated with in the MAC address table 132. Note that this aspect of the forwarding mechanism is also different from conventional forwarding methods in that this packet may not be forwarded onto the logical port associated with the MAC address as indicated in the MAC address table 132. Rather, this packet may be forwarded onto a different logical port than what is indicated in the MAC address table 132. More specifically, this packet is forwarded onto the logical port that is associated with the root PW 101 regardless of what is indicated in the MAC address table 132.

When network element PE1 130 receives a packet on logical port P3 113 associated with root PW 101, responsive to determining that the destination MAC address of this packet corresponds to a MAC address in the MAC address table 132 stored in the network element PE1 130, the forwarding module 133 forwards this packet onto that logical port as indicated by the MAC address table 132.

While the forwarding mechanism has been described above with respect to network element PE1 130, the same forwarding mechanism applies to network element PE2 140. It should also be noted that while the exemplary e-tree service network shown in FIG. 1 has only two provider's edge network element PE1 130 and PE2 140, and each provider's edge network element has only one locally connected root AC and one locally connected leaf AC, the address learning and enhanced forwarding mechanisms described herein apply to any arbitrary e-tree service network with any number of provider's edge network elements and any number of root ACs or leaf ACs attached to each provider's edge network element. Furthermore, each root AC or leaf AC attached to a provider's edge network element may be part of the same e-tree service network, or be part of a different e-tree service network. In another embodiment, if an edge network element has only locally connected root ACs, then it is only necessary for that edge network element to establish a single PW to other edge network elements in the network.

The operations of the flow diagrams in FIGS. 2 and 3A-3B will now be described. However, it should be understood that the operations of the flow diagrams in FIGS. 2 and 3A-3B can be performed by embodiments of the invention other than those discussed with reference to FIG. 1, and the embodiments discussed with reference to FIG. 1 can perform operations different than those discussed with reference to the flow diagrams of FIGS. 2 and 3A-3B.

Figure 2:
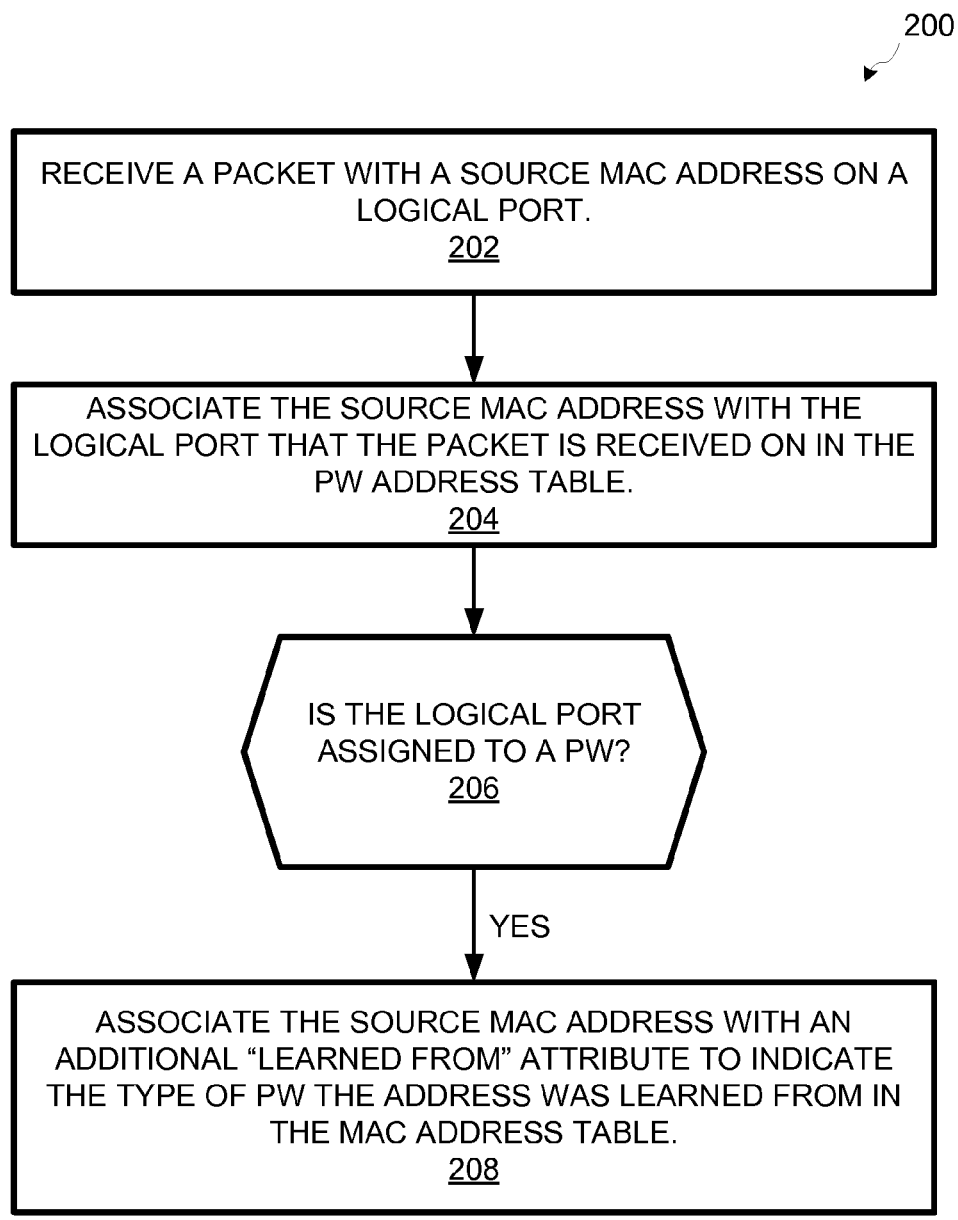
FIG. 2 illustrates a method for address learning in an e-tree service network according to one embodiment of the invention.

FIG. 2 illustrates a flow diagram for a method of address learning 200 in a network element in an e-tree service network in accordance to one embodiment of the present invention. In one embodiment, the method of address learning 200 is performed by a learning module in the network element. It should be understood that the learning module can be implemented with software, hardware, or a combination of both.

In block 202, the network element receives a packet with an unknown source MAC address on a logical port. In block 204, the network element associates the source MAC address with the logical port that the packet is received on in a MAC address table. In block 206, the network element determines if that logical port is associated with a PW (i.e., the logical port has been assigned to a PW). If it is determined that the logical port is associated with a PW, then in block 208, the network element associates the source MAC address with an additional attribute in the MAC address table to indicate the type of PW that the MAC address was learned from. In one embodiment, this attribute is a "learned from (FRM)" attribute. A value of "LPW" indicates that the MAC address was learned from a logical port that is assigned to a leaf PW, and a value of "RPW" indicates that the MAC address was learned from a logical port that is assigned to a root PW. A "null" value indicates that the MAC address was not learned from a logical port assigned to a PW (e.g., the MAC address was learned from a logical port assigned to a root access circuit or to a leaf access circuit). In an alternative embodiment, a default value for the "learned from" attribute can be used to indicate that the MAC address was not learned from a logical port assigned to a PW. In other embodiments, more than one attributes may be used. For example, there can be a "leaned from root" attribute and a separate "learned from leaf" attribute in the MAC address table.

Figure 3A:
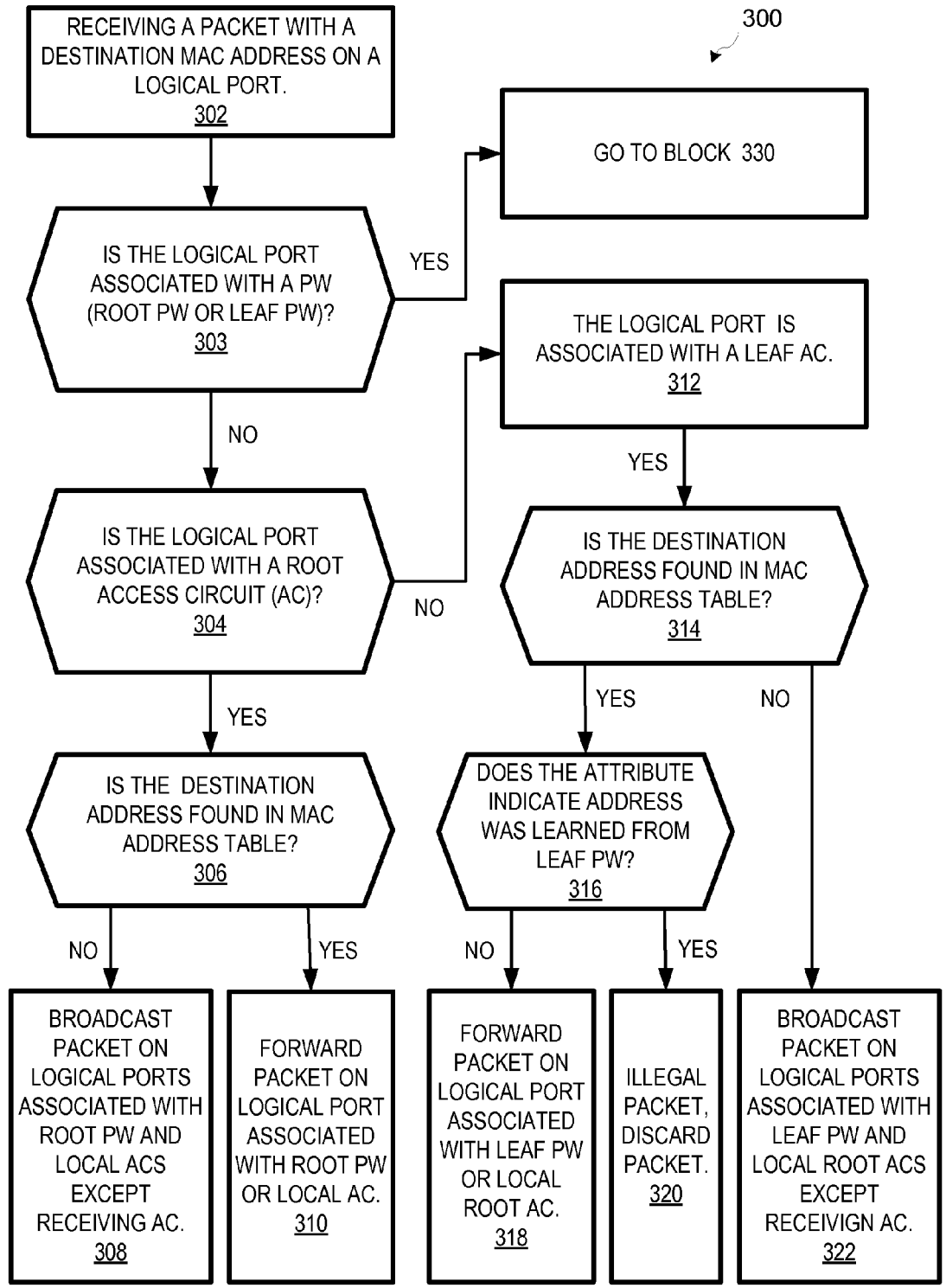
FIG. 3A illustrates a part of a method for packet forwarding in an e-tree service network according to one embodiment of the invention.

FIG. 3A illustrates a flow diagram for a method of enhanced packet forwarding 300 in a network element in an e-tree service network in accordance to one embodiment of the present invention. The method of packet forwarding 300 is used to determine which PW (if any) and/or which locally connected AC (if any) that the network element should forward or broadcast a packet onto when the network element receives a packet on one of its logical ports. In one embodiment, the method of packet forwarding 300 is performed by a forwarding module in the network element. The forwarding module can be implemented with software, hardware, or a combination of both.

In block 302, the network element receives a packet with a destination MAC address on one of its logical ports. In block 303, the network element determines if the logical port that received the packet is associated with a PW (i.e. the logical port is assigned to either a root PW or a leaf PW). If the logical port is associated with a PW, then the method continues to block 330, which will be described with reference to FIG. 3B. If the logical port is not associated with a PW (i.e. the logical port is assigned to either a local root AC or leaf AC), then in block 304, the network element determines if the logical port is associated with a root AC. If the logical port is associated with a root AC, then in block 306, the network element determines if the destination MAC address of the packet is found in the MAC address table. If it is determined that the destination MAC address is not in the MAC address table, then in block 308, the network element broadcasts the packet on the logical ports that are associated with the root PW and on the logical ports that are associated with local access circuits (i.e. logical ports that are assigned to either the root PW, a leaf AC, or a root AC). If it is determined that the destination MAC address is in the MAC address table, then in block 310, if the "learned from" attribute associated with the destination MAC address indicates that the MAC address was not learned from a PW, the network element forwards the packet on the logical port as indicated in the MAC address table. Otherwise, the network element forwards the packet on the logical port associated with the root PW (i.e. the logical port that is assigned to the root PW).

Referring back to block 304, if the logical port that received the packet is not associated with a root AC, then the logical port is associated with a leaf AC as indicated in block 312. In block 314, the network element determines if the destination MAC address of the packet is found in the MAC address table. If it is determined that the destination MAC address is not in the MAC address table, then in block 322, the network element broadcasts the packet on the logical ports that are associated with the leaf PW and on the logical ports that are associated with local root access circuits (i.e. logical ports that are assigned to either the leaf PW or a root AC). If it is determined that the destination MAC address is in the MAC address table, then in block 316, it is determined if the "learned from" attribute associated with the destination MAC address indicates that the MAC address was learned from a leaf PW. If the "learned from" attribute indicates that the destination MAC address was learned from a leaf PW, then the packet is an illegal packet, and in block 320, the network element drops and discards the packet. Otherwise, in block 318, if the "learned from" attribute associated with the destination MAC address indicates that the MAC address was learned from a root PW, the network element forwards the packet on the logical port associated with the leaf PW (i.e. the logical port that is assigned to the leaf PW), or if the destination MAC address is not learned from a PW and is associated with a local root AC, then the network element forwards the packet on the logical port as indicated in the MAC address table.

Figure 3B:
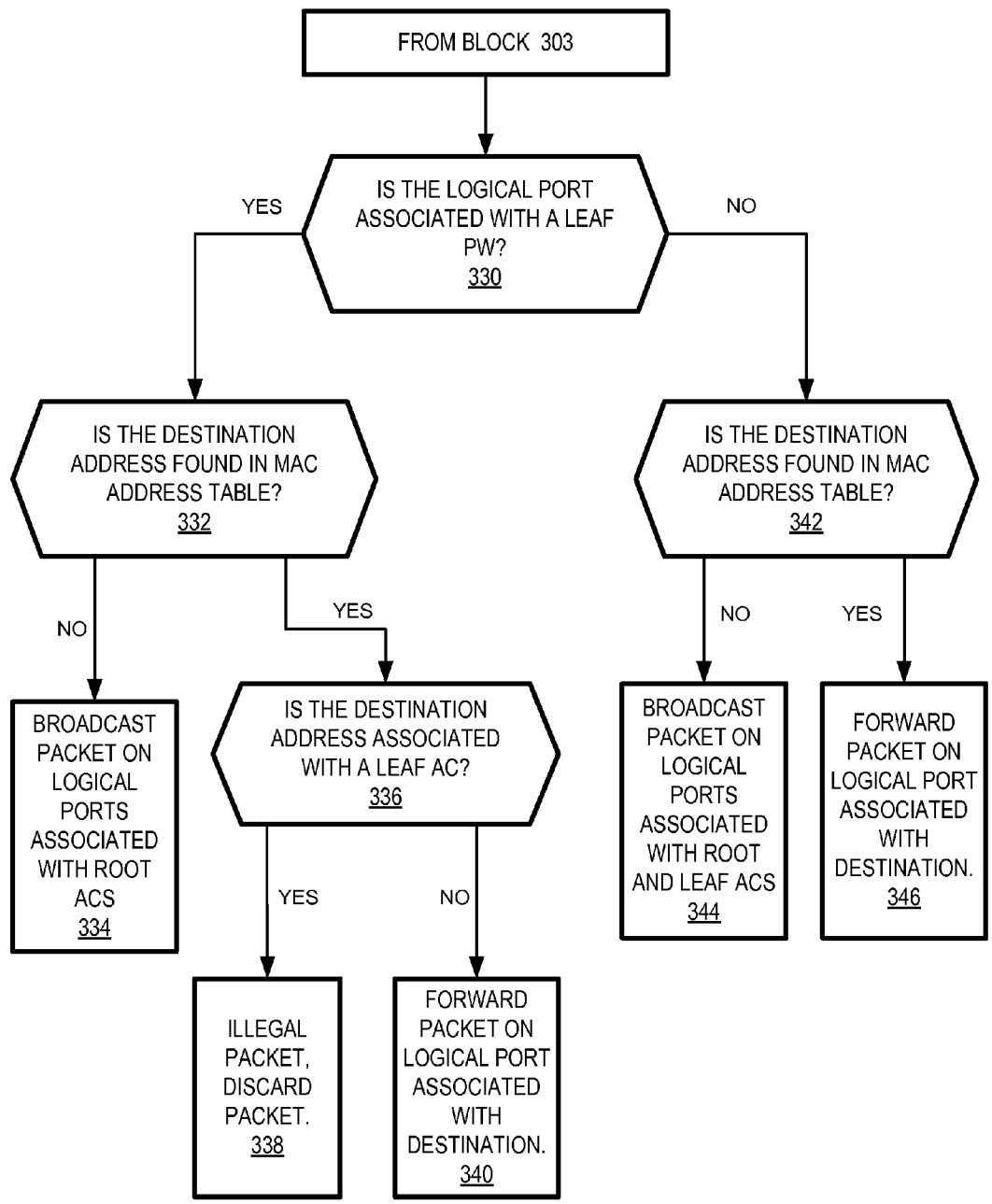
FIG. 3B illustrates another part of a method for packet forwarding in an e-tree service network according to one embodiment of the invention.

Referring back to block 303, if it is determined that logical port that received the packet is associated with a PW (i.e. the logical port is assigned to either a root PW or a leaf PW), the method continues as shown FIG. 3B. In block 330, the network element determines if the logical port that received the packet is associated with a leaf PW. If the logical port is associated with a leaf PW, then in block 332, it is determined if the destination MAC address of the packet is found in the MAC address table. If the destination MAC address is not found in the MAC address table, then in block 334, the network element broadcasts the packet on the logical ports that are associated with the root PW and on the logical ports that are associated with local root access circuits (i.e. logical ports that are assigned to a root AC). If the destination MAC address is found in the MAC address table, then in block 336, it is determined if that destination MAC address is associated with a leaf AC. If the destination MAC address is associated with a leaf AC, then the packet is an illegal packet, and in block 338, the network element drops and discards the packet. If the destination MAC address is not associated with a leaf AC, then the network element forwards the packet on the logical port as indicated in the MAC address table.

Referring back to block 330, if it is determined that logical port that received the packet is not associated a leaf PW, then in block 342, it is determined if the destination MAC address of the packet is found in the MAC address table. If the destination MAC address is not found in the MAC address table, then in block 334, the network element broadcasts the packet on the logical ports that are associated with local access circuits (i.e. logical ports that are assigned to either a leaf AC or a root AC). If the destination MAC address is found in the MAC address table, then the network element forwards the packet on the logical port as indicated in the MAC address table.

Figure 4A:
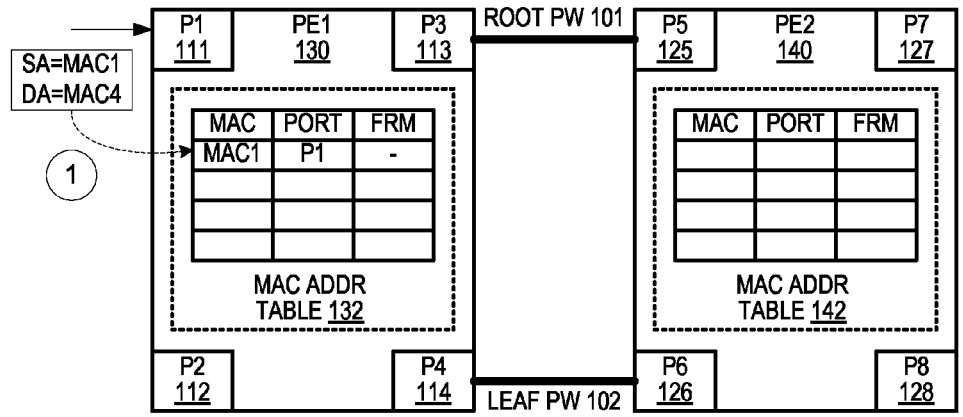
FIG. 4A illustrates the address learning and packet forwarding processes in network elements of an e-tree service network at a first point in time according to one embodiment of the invention.

By way of example, to further illustrate the operations of the flow diagrams of FIGS. 2 and 3A-3B, FIGS. 4A-4M show a series of packets received by the network elements PE1 130 and PE2 140 in the exemplary e-tree service network as shown in FIG. 1. The circles enclosing a number in the figures represent the chronological order of events. However, it should be understood that events within the same figure may occur concurrently or in a different order than what is indicated by the numbers enclosed in the circles. As shown in FIG. 4A, initially, the MAC address tables 132 and 142 of network elements PE1 130 and PE2 140 do not have all of the MAC addresses of the network elements in the network. At event 1, network element PE1 130 receives a packet with a source MAC address of MAC 1 and a destination address MAC4 on logical port P1 111. Network element PE1 130 associates MAC address MAC1 with logical port P1 111 in the MAC address table 132 in accordance to block 204. Because logical port P1 111 is assigned to local root AC RAC1 171 instead of a PW, the "learned from" attribute for this entry in the MAC address table 132 has a null or default value to indicate that the MAC address MAC1 was not learned from a PW.

Figure 4B:
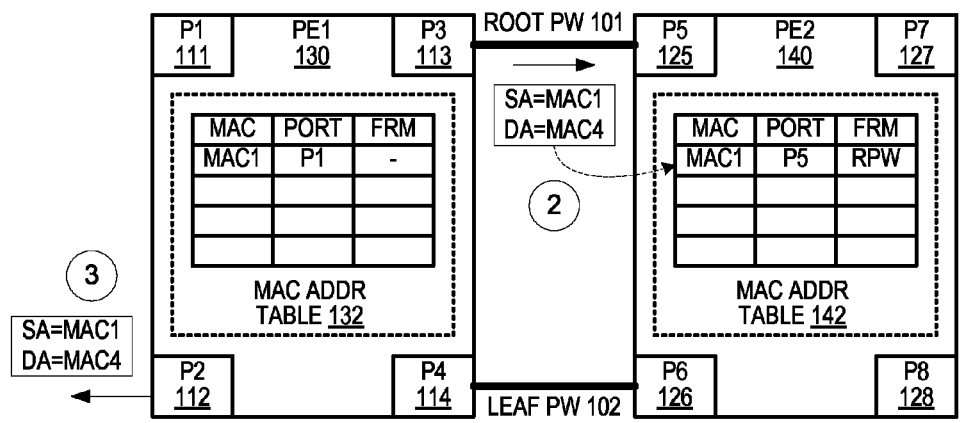
FIG. 4B illustrates the address learning and packet forwarding processes in network elements of an e-tree service network at a second point in time according to one embodiment of the invention.

At events 2 and 3 in FIG. 4B, network element PE1 130 broadcasts this packet on the logical port P3 113 assigned to the root PW 101 (logical port P3 113) and on logical port P2 112 assigned to the other local AC LAC1 181 because the destination MAC address MAC4 is not found in the MAC address table 132 in accordance to block 308. Upon receiving this packet on logical port P5 125, network element PE2 140 associates MAC address MAC1 with logical port P5 125 in the MAC address table 142 in accordance to block 204, and also associates MAC address MAC1 with the "learned from" attribute with a value of "RPW" in MAC address table 142 to indicate that MAC address MAC1 was learned from root PW 101 in accordance to block 208.

Figure 4C:
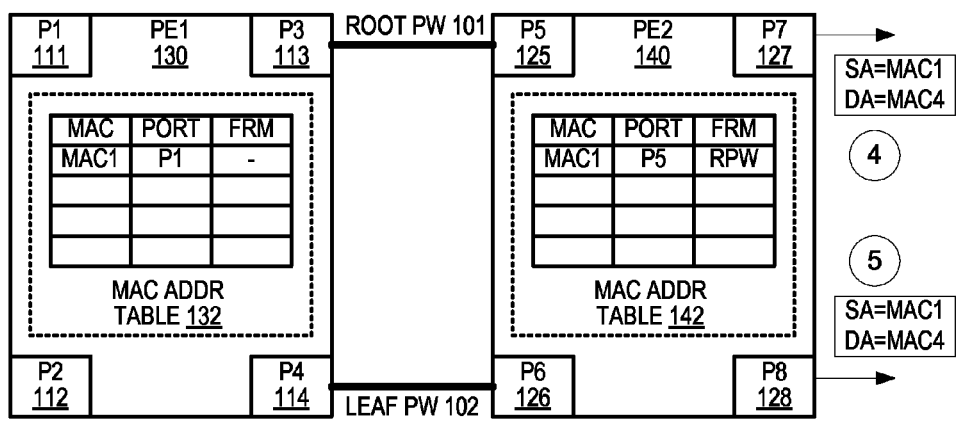
FIG. 4C illustrates the address learning and packet forwarding processes in network elements of an e-tree service network at a third point in time according to one embodiment of the invention.
Figure 4D:
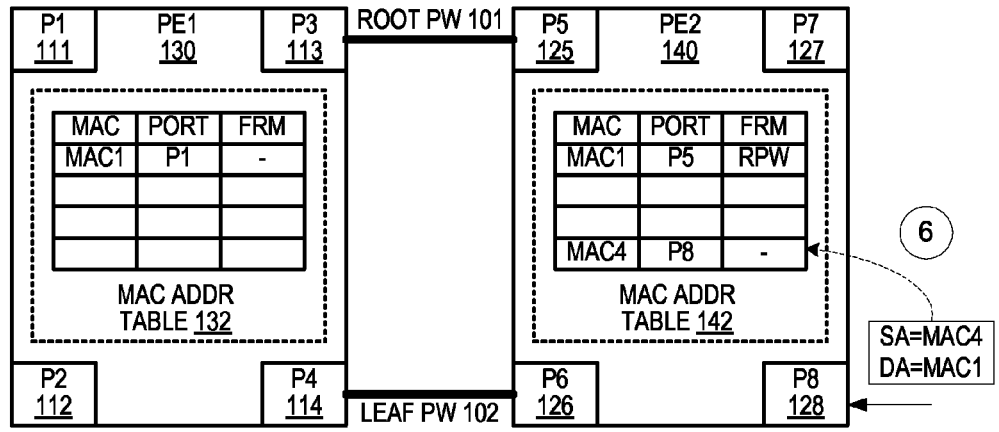
FIG. 4D illustrates the address learning and packet forwarding processes in network elements of an e-tree service network at a fourth point in time according to one embodiment of the invention.

At events 4 and 5 in FIG. 4C, network element PE2 140 broadcasts this packet on the logical port P7 127 assigned to local root AC RAC2 172 and logical port P8 128 assigned to local leaf AC LAC2 182 because the destination MAC address MAC4 is not found in the MAC address table 142 in accordance to block 344. When network element CE4 194 having MAC address MAC4 (the intended recipient of this packet) receives this packet from network element PE2 140, network element CE4 194 will send a reply packet with a source MAC address MAC4 and a destination MAC address MAC1 towards logical port P8 128 of network element PE2 140 as indicated by event 6 in FIG. 4D. When network element PE2 140 receives this packet, network element PE2 140 associates the source MAC address MAC4 with logical port P8 128 in the MAC address table 142 in accordance to block 204. Because logical port P8 128 is assigned to local leaf AC LAC2 182 instead of a PW, the "learned from" attribute for this entry in the MAC address table 142 has a null or default value to indicate that the MAC address MAC4 was not learned from a PW.

Figure 4E:
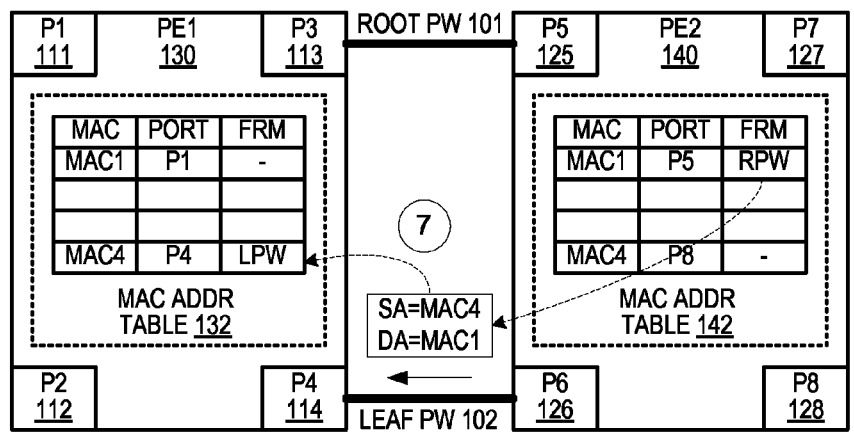
FIG. 4E illustrates the address learning and packet forwarding processes in network elements of an e-tree service network at a fifth point in time according to one embodiment of the invention.

At event 7 in FIG. 4E, network element PE2 140 determines that the logical port P8 128 that received this packet is associated with leaf AC LAC2 182, that the destination MAC address MAC1 of the packet is found in its MAC address table 142, and that the "learned from" attribute associated with this MAC address MAC1 indicates that the MAC address MAC1 was learned from root PW 101. Then, in accordance to block 318, network element PE2 140 forwards this packet on logical port P6 126 assigned to the leaf PW 102 regardless of what is indicated in the MAC address table 142. When network element PE1 130 receives this packet with source MAC address MAC4, network element PE1 130 associates MAC address MAC4 with logical port P4 114 in the MAC address table 132 in accordance to block 204, and also associates MAC address MAC4 with the "learned from" attribute with a value of "LPW" in MAC address table 132 to indicate that MAC address MAC4 was learned from leaf PW 102 in accordance to block 208.

Figure 4F:
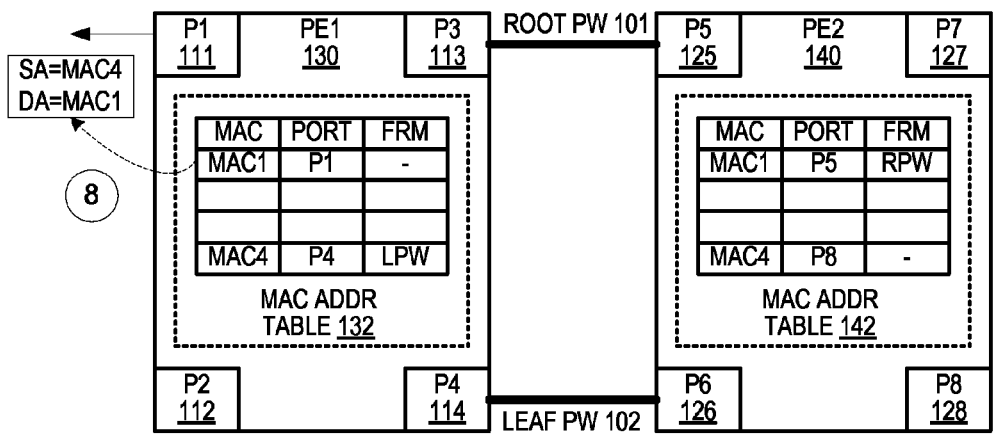
FIG. 4F illustrates the address learning and packet forwarding processes in network elements of an e-tree service network at a sixth point in time according to one embodiment of the invention.

At event 8 in FIG. 4F, network element PE1 130 determines that the logical port P4 114 that received this packet is associated with leaf PW 102, that the destination MAC address MAC1 of the packet is found in its MAC address table 132, and that the destination MAC address MAC1 is associated with a local root AC RAC1 171. Then, in accordance to block 340, network element PE1 130 forwards this packet on logical port P1 111 assigned to the root AC1 RAC1 171 as indicated in the MAC address table 132.

Figure 4G:
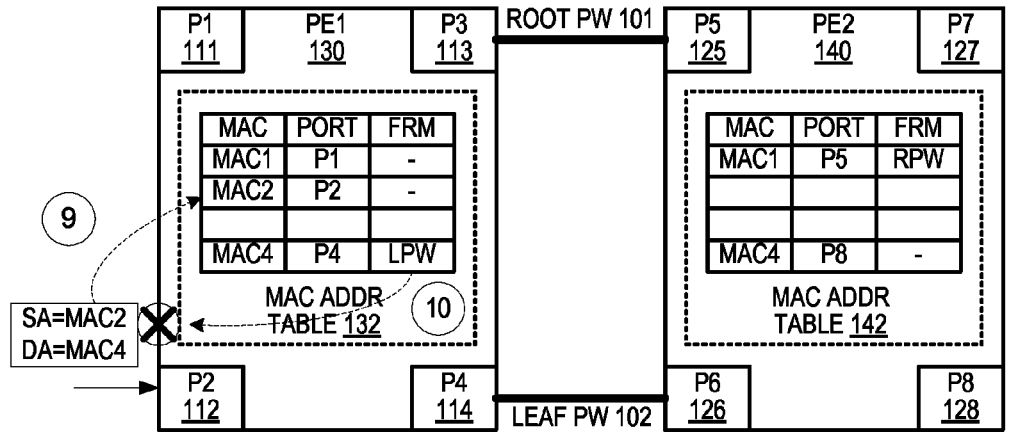
FIG. 4G illustrates the address learning and packet forwarding processes in network elements of an e-tree service network at a seventh point in time according to one embodiment of the invention.

At event 9 in FIG. 4G, network element PE1 130 receives a packet with source MAC address MAC2 and destination MAC address MAC4 on logical port P2 112. Network element PE1 130 associates MAC address MAC2 with logical port P2 112 in the MAC address table 132 in accordance to block 204. Because logical port P2 112 is assigned to local leaf AC LAC1 181 instead of a PW, the "learned from" attribute for this entry in the MAC address table 132 has a null or default value to indicate that the MAC address MAC2 was not learned from a PW. At event 10, network element PE1 130 determines that the logical port P2 112 that received this packet is associated with local leaf AC LAC1 181, that the destination MAC address MAC4 of the packet is found in its MAC address table 132, and that the "learned from" attribute associated with destination MAC address MAC4 indicates that this MAC address was learned from leaf PW 102. Then, in accordance to block 320, network element PE1 130 drops and discards this packet because this is an illegal packet sent from a leaf node intended for a leaf node.

Figure 4H:
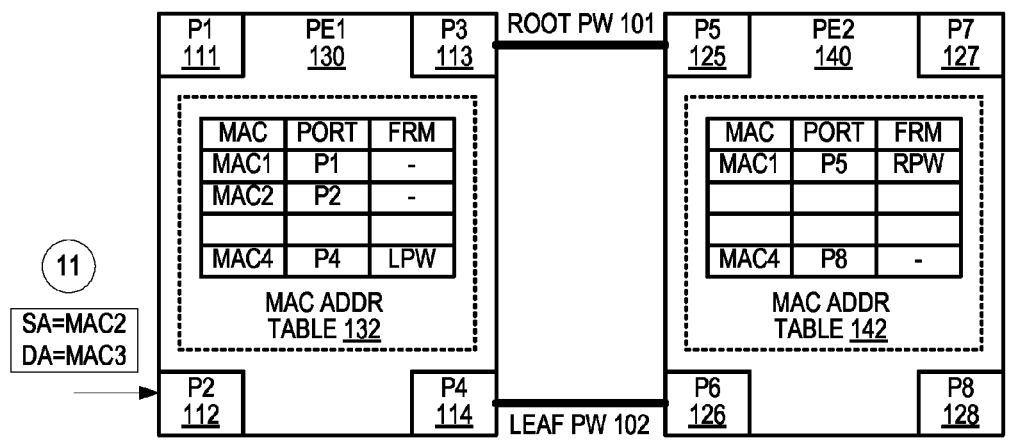
FIG. 4H illustrates the address learning and packet forwarding processes in network elements of an e-tree service network at an eighth point in time according to one embodiment of the invention.
Figure 4J:
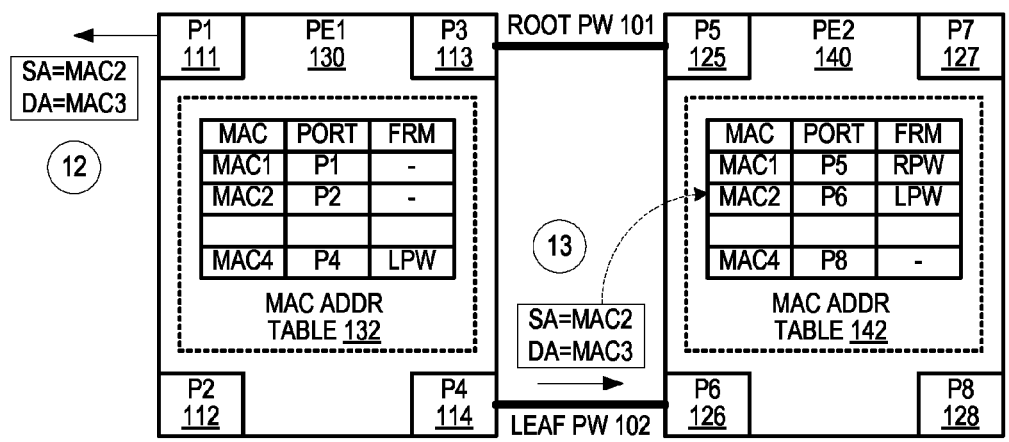
FIG. 4J illustrates the address learning and packet forwarding processes in network elements of an e-tree service network at a ninth further point in time according to one embodiment of the invention.

At event 11 in FIG. 4H, network element PE1 130 receives a packet with source MAC address MAC2 and destination MAC address MAC3 on logical port P2 112. At events 12 and 13 in FIG. 4J, network element PE1 130 determines that the logical port P2 112 that received this packet is associated with local leaf AC LAC1 181 and that the destination MAC address MAC3 of the packet is not found in its MAC address table 132. Then, in accordance to block 322, network element PE1 130 broadcasts this packet on the logical port P1 111 assigned to root AC RAC1 171 and on logical port P4 114 assigned to leaf PW 102. Upon receiving this packet on logical port P6 126, network element PE2 140 associates the source MAC address MAC2 with logical port P6 126 in the MAC address table 142 in accordance to block 204, and also associates MAC address MAC2 with the "learned from" attribute having a value of "LPW" in MAC address table 142 to indicate that MAC address MAC2 was learned from leaf PW 102 in accordance to block 208.

Figure 4K:
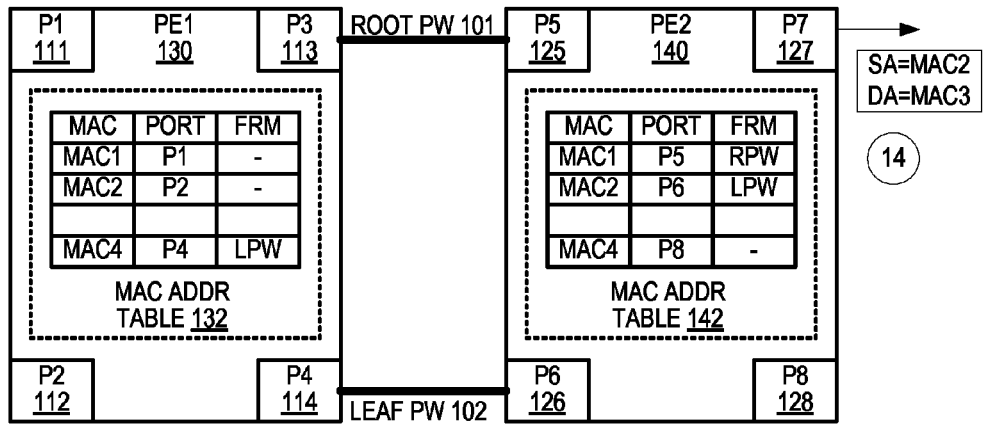
FIG. 4K illustrates the address learning and packet forwarding processes in network elements of an e-tree service network at a tenth point in time according to one embodiment of the invention.
Figure 4L:
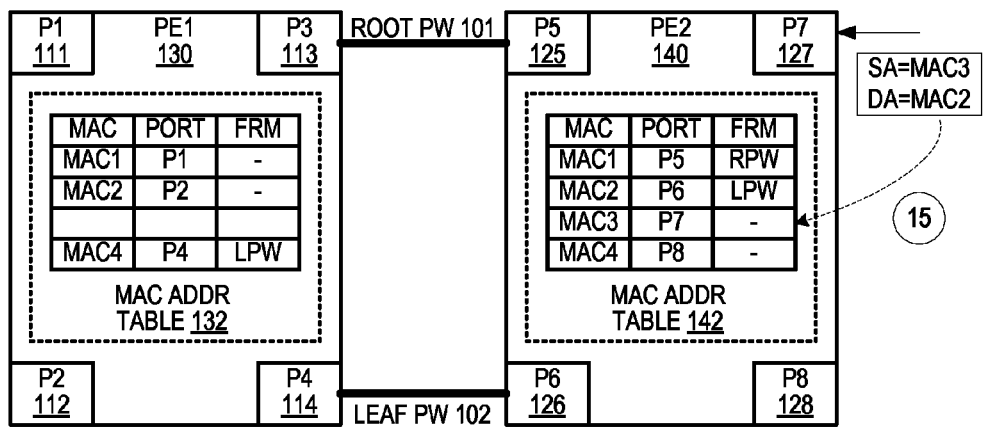
FIG. 4L illustrates the address learning and packet forwarding processes in network elements of an e-tree service network at an eleventh point in time according to one embodiment of the invention.

At event 14 in FIG. 4K, network element PE2 140 determines that the logical port P6 126 that received this packet is associated with leaf PW 102 and that the destination MAC address MAC3 of the packet is not found in its MAC address table 142. Then, in accordance to block 334, network element PE2 140 broadcasts this packet on the logical port P7 127 assigned to root AC RAC2 172. When network element CE3 193 having MAC address MAC3 (the intended recipient of this packet) receives this packet from network element PE2 140, network element CE3 193 will send a reply packet with a source MAC address MAC3 and a destination MAC address MAC2 towards logical port P7 127 of network element PE2 140 as indicated by event 15 in FIG. 4L. When network element PE2 140 receives this packet, network element PE2 140 associates the source MAC address MAC3 with logical port P7 127 in the MAC address table 142 in accordance to block 204. Because logical port P7 127 is assigned to local root AC RAC2 172 instead of a PW, the "learned from" attribute for this entry in the MAC address table 142 has a null or default value to indicate that the MAC address MAC3 was not learned from a PW.

Figure 4M:
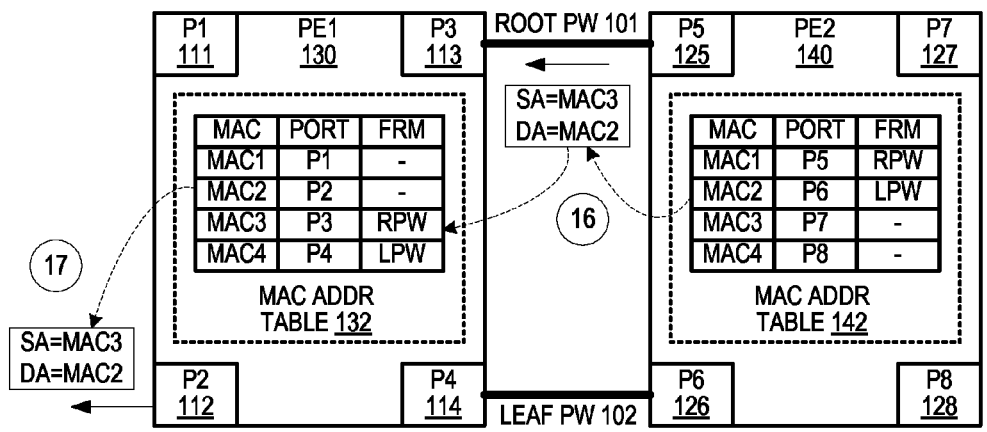
FIG. 4M illustrates the address learning and packet forwarding processes in network elements of an e-tree service network at a twelfth point in time according to one embodiment of the invention.

At event 16 in FIG. 4M, network element PE2 140 determines that the logical port P7 127 that received this packet is associated with root AC RAC2 172, and that the destination MAC address MAC2 of the packet is found in its MAC address table 142. Then, in accordance to block 310, network element PE2 140 forwards this packet on logical port P5 125 assigned to the root PW 101 regardless of what is indicated in the MAC address table 142 because the "learned from" attribute associated with the destination MAC address MAC2 indicates that the MAC address was learned from a PW. When network element PE1 130 receives this packet with source MAC address MAC3, network element PE1 130 associates MAC address MAC3 with logical port P3 113 in the MAC address table 132 in accordance to block 204, and also associates MAC address MAC3 with the "learned from" attribute with a value of "RPW" in MAC address table 132 to indicate that MAC address MAC3 was learned from root PW 101 in accordance to block 208. At event 17, network element PE1 130 determines that the logical port P3 113 that received this packet is associated with root PW 101 and that the destination MAC address MAC2 of the packet is found in its MAC address table 132. Then, in accordance to block 346, network element PE1 130 forwards this packet on the logical port P2 112 assigned to leaf AC LAC1 181 as indicated in MAC address table 132.

Figure 5:
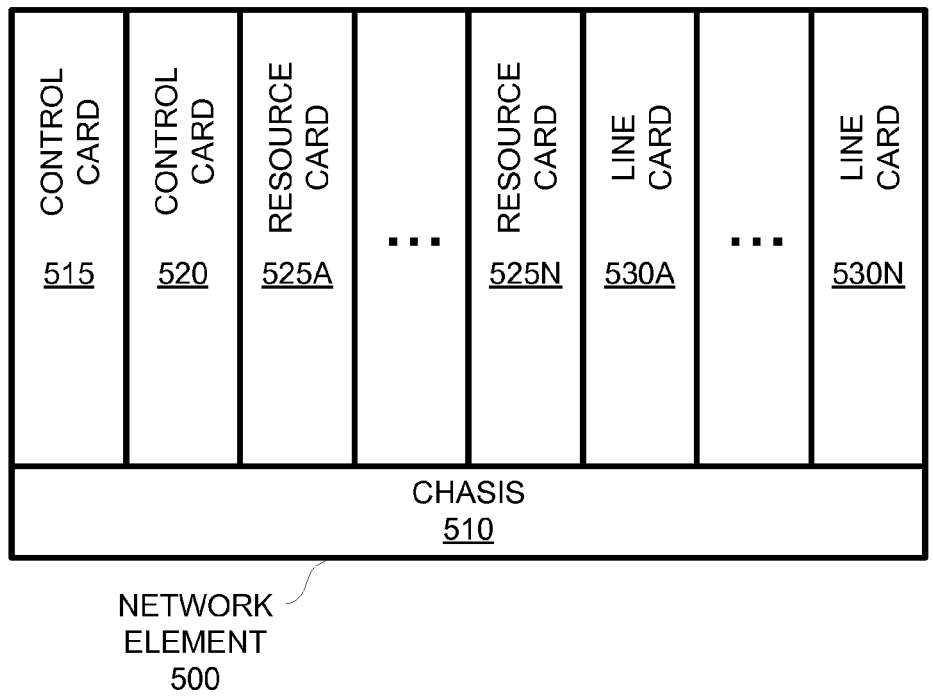
FIG. 5 illustrates a network element according to one embodiment of the invention.

FIG. 5 illustrates an exemplary network element used in some embodiments of the invention. As illustrated in FIG. 5, the network element 500 includes the control cards 515 and 520 (e.g., one control card is active the other is a backup), the resource cards 525A-525N, and the line cards 530A-530N. These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms. It should be understood that the architecture of the network element 500 illustrated in FIG. 5 is exemplary, and different combinations of cards may be used in other embodiments of the invention. For example, some network elements may include a set of one or more control cards, a set of zero or more resource cards, and a set of one or more line cards. In one embodiment, any of the network elements may have an architecture similar to that as illustrated in FIG. 5.

Figure 6:
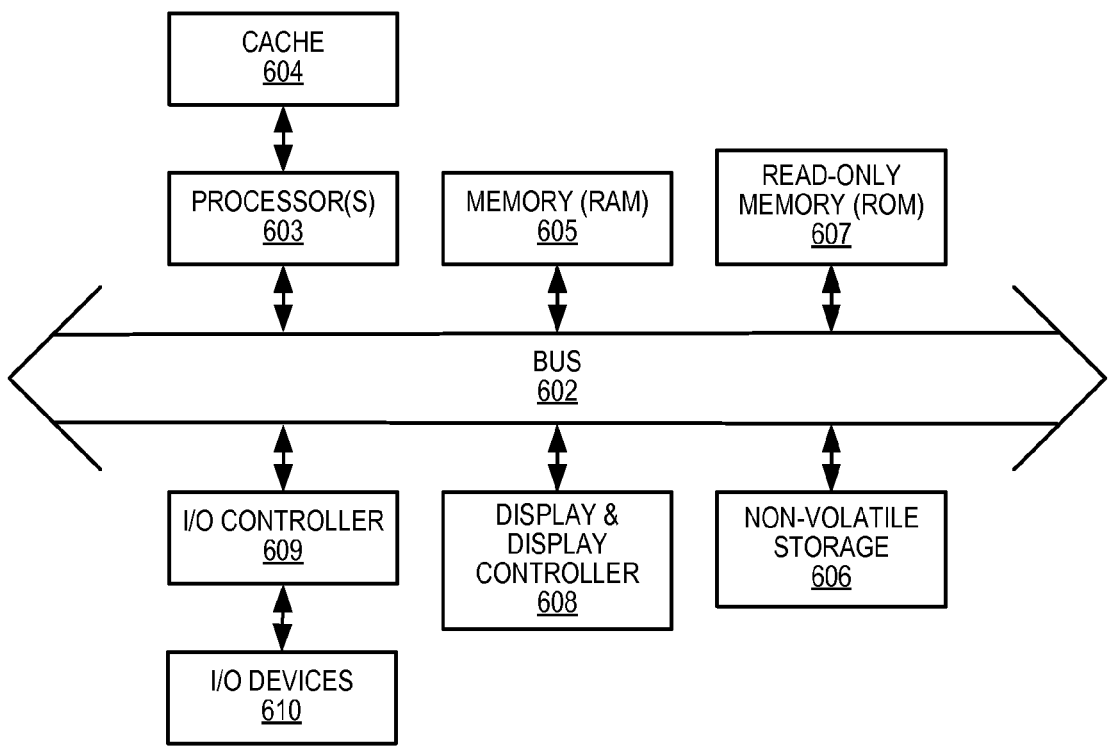
FIG. 6 illustrates a line/control card in a network element according to one embodiment of the invention.

Each of the cards illustrated in FIG. 5 include one or more processors and one or more memories as shown in FIG. 6. For example, the line cards 530A-530B typically include one or more packet processing units to process packets including forwarding and/or switching packets at high speed, and include one or more memories to store a one or more MAC address tables described herein. The control cards 515 and 520 also include one or more processors 603 to perform signaling, routing (including creation of and/or management of MAC address tables), connection setup, session setup, etc. For example, among other things, the control card 515 executes instructions stored in memory (e.g., cache 604, RAM 605, ROM 607, or non-volatile storage 606) to execute the learning and forwarding modules described herein. As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors 603 coupled to one or more other components, such as one or more storage devices 606 (non-transitory machine-readable storage media), user input/output devices 610 (e.g., a keyboard, a touchscreen, and/or a display), and network connections. The coupling of the set of processors and other components is typically through one or more busses and bridges 602 (also termed as bus controllers). Thus, the storage device of a given electronic device typically stores code and/or data for execution on the set of one or more processors 603 of that electronic device. Of course, one or more parts of an embodiment of the invention may be implemented using different combinations of software, firmware, and/or hardware.

Alternative Embodiments

While embodiments of the invention has been described in relation to a simplified e-tree service network, the methods described herein applies to other more complex e-tree service network with any number of network elements and any number of root and leaf access circuits attached to each provider's edge network elements. Therefore, embodiments of the invention are not limited to the simplified e-tree service network illustrated in FIG. 1. Furthermore, it should be understood that the methods described herein may be implemented in the software of a network element, or in the hardware of the network element, or a combination of both. While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first edge network element in an e-tree service network, wherein the first edge network element is coupled to a second edge network element through a set of pseudowires including a root pseudowire for carrying packets that are sent from a root network element in the e-tree service network and a leaf pseudowire for carrying packets that are sent from a leaf network element in the e-tree service network, and wherein the network element includes a plurality of logical ports including a first logical port associated with a leaf access circuit that is coupled to a local leaf node, a second logical port associated with the root pseudowire, and a third logical port associated with the leaf pseudowire, the method comprising the steps of:

receiving a first packet with a first destination Media Access Control (MAC) address on the first logical port associated with the leaf access circuit;

responsive to determining that the first destination MAC address corresponds to a first MAC address in a MAC address table stored in the first edge network element, and that a first attribute associated with the first MAC address in the MAC address table indicates that the first MAC address was learned from the leaf pseudowire, dropping the first packet;

receiving a second packet with a second destination MAC address on the first logical port associated with the leaf access circuit;

responsive to determining that the second destination MAC address corresponds to a second MAC address in the MAC address table, and that a second attribute associated with the second MAC address in the MAC address table indicates that the second MAC address was learned from the root pseudowire, forwarding the second packet out the third logical port onto the leaf pseudowire towards the second edge network element regardless of which of the plurality of logical ports that the second MAC address is associated with in the MAC address table.

2. The method of claim 1, further comprising:

receiving a third packet with a third destination MAC address on the third logical port associated with the leaf pseudowire;

responsive to determining that the third destination MAC address corresponds to a third MAC address that is associated with the first logical port associated with the leaf access circuit in the MAC address table, dropping the third packet.

3. The method of claim 1, wherein the plurality of logical ports further comprises a fourth logical port associated with a root access circuit that is coupled to a local root network element, the method further comprises:

receiving a third packet with a third destination MAC address on the first logical port associated with the leaf access circuit;

responsive to determining that the MAC address table does not have an entry corresponding to the third destination MAC address, broadcasting the third packet out the third logical port onto the leaf pseudowire towards the second edge network element and out the fourth logical port onto the root access circuit towards the local root network element.

4. The method of claim 3, further comprising:
receiving a fourth packet with a fourth destination MAC address on the third logical port associated with the leaf pseudowire;
responsive to determining that the fourth destination MAC address corresponds to a fourth MAC address that is associated with the fourth logical port associated with the root access circuit in the MAC address table, forwarding the fourth packet out the fourth logical port onto the root access circuit towards the local root network element.

5. The method of claim 3, further comprising:
receiving a fourth packet with a fourth destination MAC address on the third logical port associated with the leaf pseudowire;
responsive to determining that the MAC address table does not have an entry corresponding to the fourth destination MAC address, broadcasting the fourth packet out the fourth logical port onto the root access circuit towards the local root network element.

6. The method of claim 3, further comprising:
receiving a fourth packet with a fourth destination MAC address on the second logical port associated with the root pseudowire;
responsive to determining that the MAC address table does not have an entry corresponding to the fourth destination MAC address, broadcasting the fourth packet out the first logical port onto the leaf access circuit towards the local leaf network element and out the fourth logical port onto the root access circuit towards the local root network element.

7. The method of claim 3, further comprising:
receiving a fourth packet with a fourth destination MAC address on the fourth logical port associated with the root access circuit;
responsive to determining that the MAC address table does not have an entry corresponding to the fourth destination MAC address, broadcasting the fourth packet out the first logical port onto the leaf access circuit towards the local leaf network element and out the second logical port onto the root pseudowire towards the second edge network element.

8. The method of claim 1, further comprising:
receiving a third packet with a source MAC address on one of the plurality of logical ports;
responsive to determining that the MAC address table does not have an entry corresponding to the source MAC address, storing in a new entry in the MAC address table the source MAC address, the logical port that the third packet was received on, and, if that logical port is associated with one of the pseudowires, an attribute to indicate whether that logical port is associated with the root pseudowire or with the leaf pseudowire.

9. An edge network element in an e-tree service network, the edge network element comprising:
a set of one or more processors;
a memory, coupled with the set of processors, storing instructions that when executed by the set of processors, cause the set of processors to perform the following:
receive a first packet with a first destination MAC address on a first logical port associated with a leaf access circuit that is to couple the edge network element with a local leaf network element in the e-tree service network;
responsive to determining that the first destination MAC address corresponds to a first MAC address in a MAC address table stored in the edge network element, and that a first attribute associated with the first MAC address in the MAC address table indicates that the first MAC address was learned from a leaf pseudowire that is to couple the edge network element with another edge network element in the e-tree service network, drop the first packet;
receive a second packet with a second destination MAC address on the first logical port associated with the leaf access circuit;
responsive to determining that the second destination MAC address corresponds to a second MAC address in the MAC address table, and that an attribute associated with the second MAC address in the MAC address table indicates that the second MAC address was learned from a root pseudowire that is to couple the edge network element with the another edge network element in the e-tree service network, forward the second packet out the third logical port onto the leaf pseudowire regardless of which of the logical ports that the second MAC address is associated with in the MAC address table.

10. The network element of claim 9, wherein the instructions, when executed by the set of processors, cause the set of processors to further perform the following:
receive a third packet with a third destination MAC address on the third logical port associated with the leaf pseudowire;
responsive to determining that the third destination MAC address corresponds to a third MAC address that is associated with the first logical port associated with the leaf access circuit in the MAC address table, drop the third packet.

11. The network element of claim 9, wherein the instructions, when executed by the set of processors, cause the set of processors to further perform the following:
receive a third packet with a third destination MAC address on the first logical port associated with the leaf access circuit;
responsive to determining that the MAC address table in the network element does not have an entry corresponding to the third destination MAC address, broadcast the third packet out the third logical port onto the leaf pseudowire towards the another edge network element and out a fourth logical port that is associated with a root access circuit that is to couple the edge network element with a local root network element.

12. The network element of claim 11, wherein the instructions, when executed by the set of processors, cause the set of processors to further perform the following:
receive a fourth packet with a fourth destination MAC address on the third logical port associated with the leaf pseudowire;
responsive to determining that the fourth destination MAC address corresponds to a fourth MAC address that is associated with the fourth logical port associated with the root access circuit in the MAC address table, forward the fourth packet out the fourth logical port onto the root access circuit towards the local root network element.

13. The network element of claim 11, wherein the instructions, when executed by the set of processors, cause the set of processors to further perform the following:
receive a fourth packet with a fourth destination MAC address on the third logical port associated with the leaf pseudowire;

responsive to determining that the MAC address table does not have an entry corresponding to the fourth destination MAC address, broadcast the fourth packet out the fourth logical port onto the root access circuit towards the local root network element.

14. The network element of claim 11, wherein the instructions, when executed by the set of processors, cause the set of processors to further perform the following:
receive a fourth packet with a fourth destination MAC address on the second logical port associated with the root pseudowire;
responsive to determining that the MAC address table does not have an entry corresponding to the fourth destination MAC address, broadcast the fourth packet out the first logical port onto the leaf access circuit towards the local leaf network element and out the fourth logical port onto the root access circuit towards the local root network element.

15. The network element of claim 11, wherein the instructions, when executed by the set of processors, cause the set of processors to further perform the following:
receive a fourth packet with a fourth destination MAC address on the fourth logical port associated with the root access circuit;
responsive to determining that the MAC address table does not have an entry corresponding to the fourth destination MAC address, broadcast the fourth packet out the first logical port onto the leaf access circuit towards the local leaf network element and out the second logical port onto the root pseudowire towards the another edge network element.

16. The network element of claim 9, wherein the instructions, when executed by the set of processors, cause the set of processors to further perform the following:
receive a third packet with a source MAC address on one of the logical ports;
responsive to determining that the MAC address table does not have an entry corresponding to the source MAC address, storing in a new entry in the MAC address table the source MAC address, the logical port that the third packet was received on, and, if that logical port is associated with one of the pseudowires, an attribute to indicate whether that logical port is associated with the root pseudowire and or with the leaf pseudowire.

17. A network element in an e-tree service network, comprising:
a learning module coupled to a Media Access Control (MAC) address table, wherein the MAC address table is configured to store a set of associations between logical ports of the network element and MAC addresses of the other network elements in the e-tree service network, wherein the set of associations include an attribute to indicate whether a particular MAC address was learned from a pseudowire and a type of that pseudowire including one of a root pseudowire and a leaf pseudowire, and wherein the learning module is configured to capture source MAC addresses of packets received at the network element, and to associate the source MAC addresses with the logical ports of the network element in the MAC address table; and
a forwarding module coupled to the address table, the forwarding module configured to look up destination MAC addresses of the packets received at the network element in the MAC address table, to determine whether to forward or to discard each of the packets based on the set of associations stored in the MAC address table, and to:
for each packet received on a first logical port that is associated with a leaf access circuit that couples the network element to a local leaf network element in the e-tree service:
discard that packet if that packet's destination MAC address has a corresponding MAC address in the MAC address table and the attribute associated with that MAC address in the MAC address table indicates that the MAC address was learned from the leaf pseudowire, or
forward that packet onto the leaf pseudowire if that packet's destination MAC address has a corresponding MAC address in the MAC address table and the attribute associated with that MAC address in the MAC address table indicates that the MAC address was learned from the root pseudowire.

18. The network element of claim 17, wherein the forwarding module is further configured to:
for each packet received, determine which of the logical ports to broadcast that packet if that packet's destination MAC address is not in the MAC address table.

* * * * *